United States Patent
Su et al.

(10) Patent No.: US 9,013,449 B2
(45) Date of Patent: Apr. 21, 2015

(54) OPTICAL TOUCH SYSTEM HAVING A PLURALITY OF IMAGING DEVICES FOR DETECTING A PLURALITY OF TOUCH OBJECTS

(71) Applicant: Pixart Imaging Inc., Hsin-Chu (TW)

(72) Inventors: Tzung Min Su, Hsinchu (TW); Chih Hsin Lin, Hsinchu (TW)

(73) Assignee: Pixart Imaging Inc., Hsin-chu (TW)

( * ) Notice: Subject to any disclaimer, the term of this patent is extended or adjusted under 35 U.S.C. 154(b) by 67 days.

(21) Appl. No.: 13/656,632

(22) Filed: Oct. 19, 2012

(65) Prior Publication Data
US 2013/0106785 A1    May 2, 2013

(30) Foreign Application Priority Data
Oct. 27, 2011    (TW) .............................. 100139038 A

(51) Int. Cl.
*G06F 3/042*    (2006.01)

(52) U.S. Cl.
CPC ...................................... *G06F 3/042* (2013.01)

(58) Field of Classification Search
CPC ....................................................... G06F 3/042
USPC ....................................................... 345/175
See application file for complete search history.

(56) References Cited

U.S. PATENT DOCUMENTS

| | | | |
|---|---|---|---|
| 4,782,328 A | 11/1988 | Denlinger | |
| 2005/0200613 A1* | 9/2005 | Kobayashi et al. | 345/175 |
| 2010/0123665 A1* | 5/2010 | Birkler | 345/173 |
| 2010/0321309 A1* | 12/2010 | Lee et al. | 345/173 |
| 2010/0321340 A1* | 12/2010 | Hsiao et al. | 345/175 |
| 2010/0328244 A1* | 12/2010 | Lin et al. | 345/173 |
| 2011/0084938 A1* | 4/2011 | Wang | |
| 2011/0261016 A1* | 10/2011 | Huang | 345/175 |
| 2012/0032924 A1* | 2/2012 | Ha et al. | 345/175 |

OTHER PUBLICATIONS

Office Action from Taiwan, Republic of China, Patent Office in the corresponding Patent Application No. 100139038 dated Mar. 17, 2014, 4 pages in Chinese, 1 page of abstract in English.

* cited by examiner

*Primary Examiner* — Long D Pham
(74) *Attorney, Agent, or Firm* — Juan Carlos A. Marquez; Bacon & Thomas PLLC

(57) ABSTRACT

An optical touch system comprises a first imaging device configured to be directed toward a side surface of a target on a touch surface and a processing device. The first imaging device sequentially generates a first picture having an image of the target and a second picture having an image of the target. The computing device is configured to calculate a first dimension of the target using the first picture and a second dimension of the target using the second picture, and to determine whether the target is formed by one object or two objects by the first and second dimensions.

16 Claims, 16 Drawing Sheets

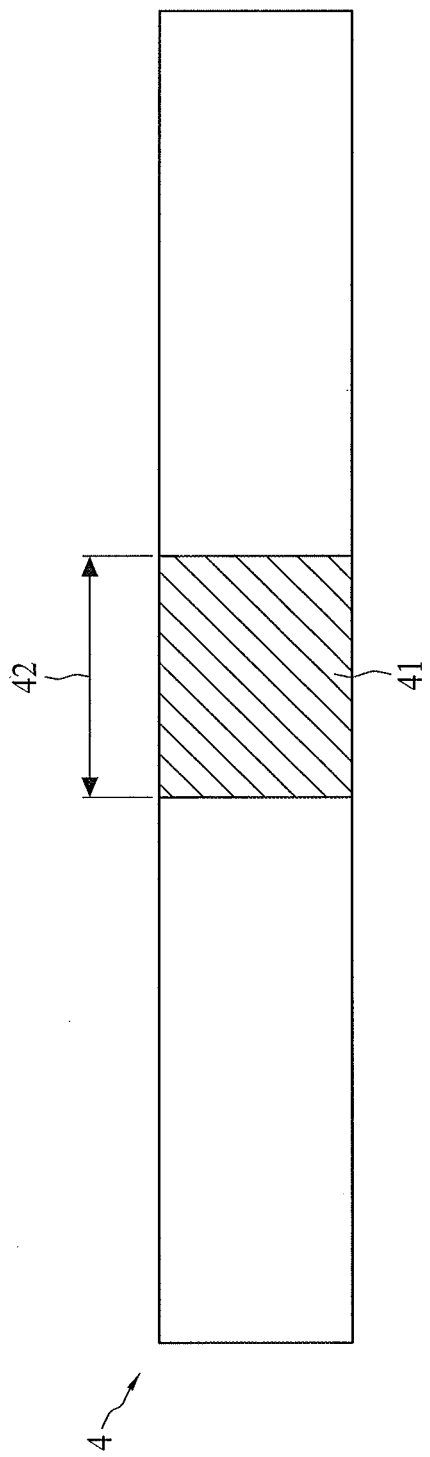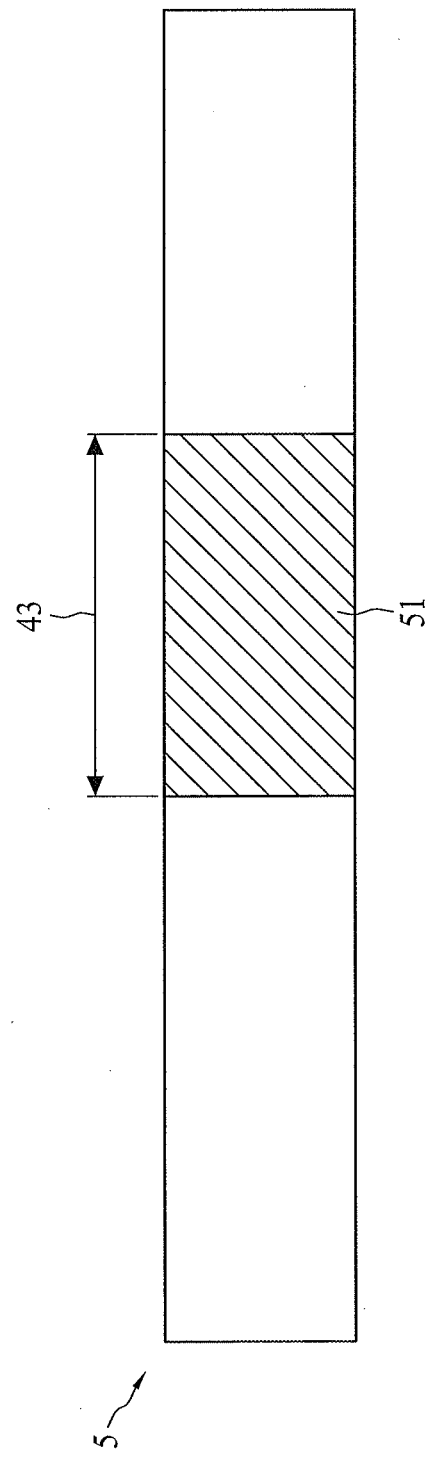

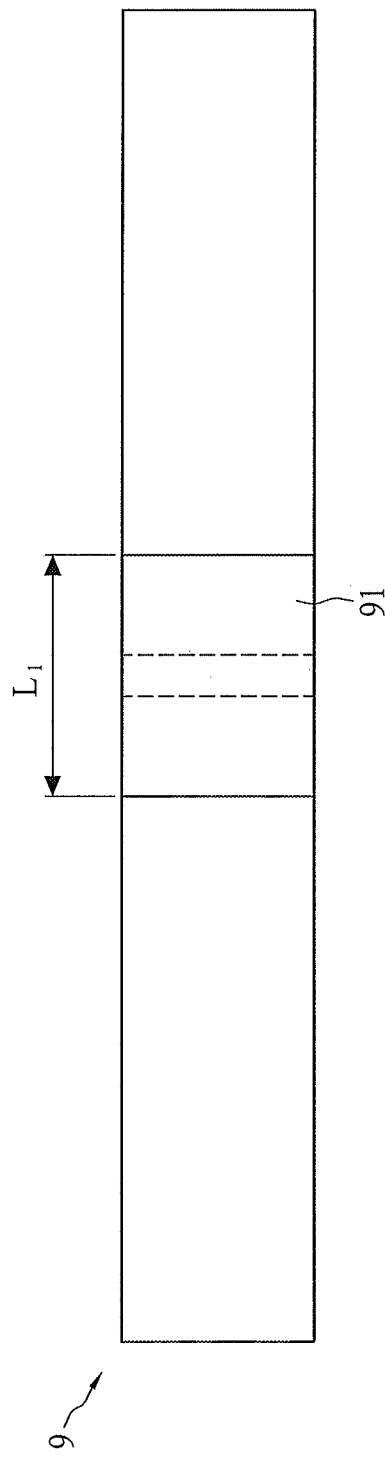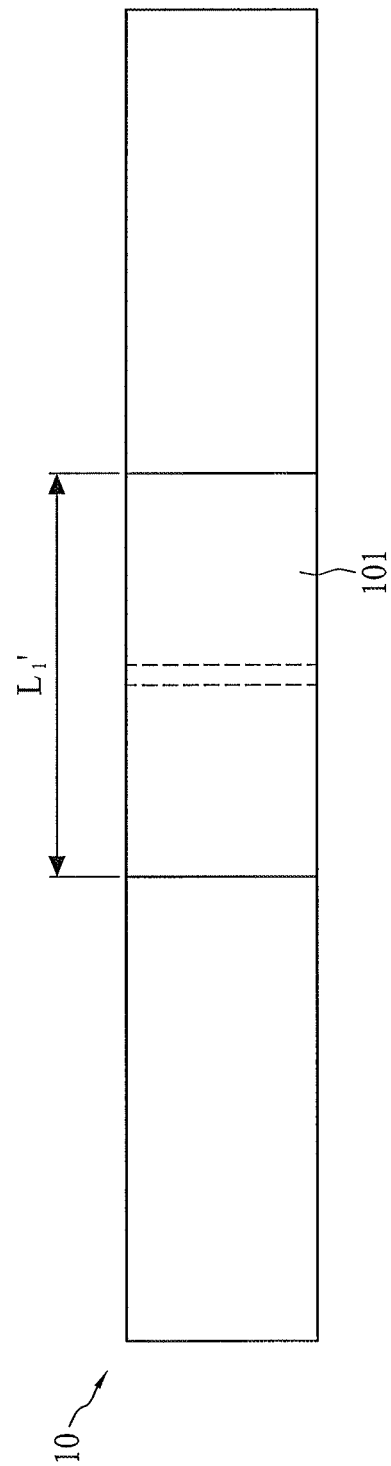

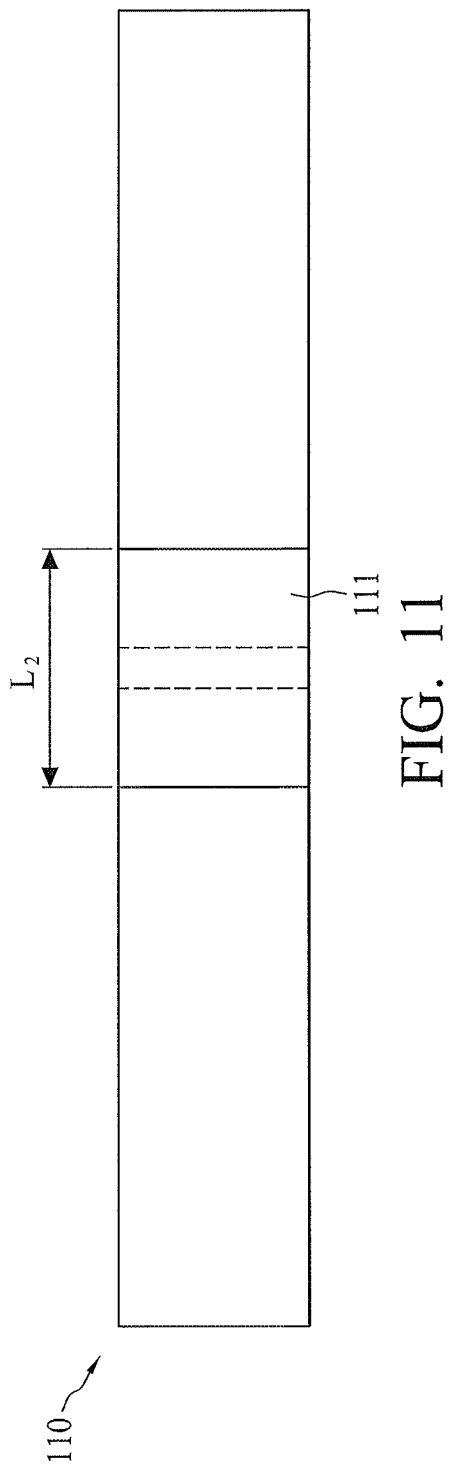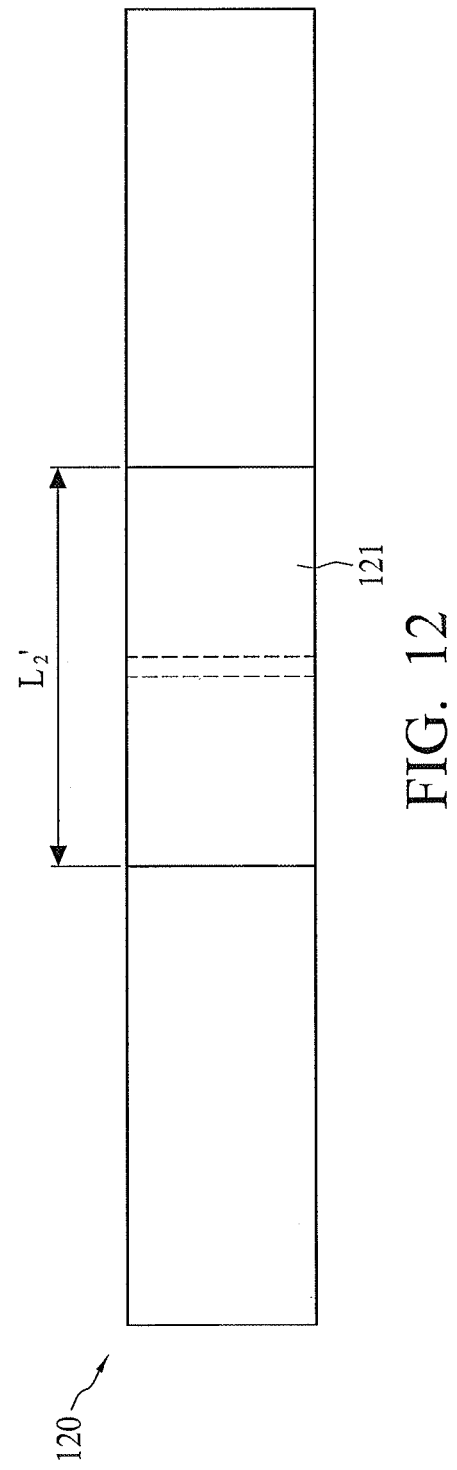

OPTICAL TOUCH SYSTEM HAVING A PLURALITY OF IMAGING DEVICES FOR DETECTING A PLURALITY OF TOUCH OBJECTS

CROSS-REFERENCE TO RELATED APPLICATION

The present application is based on, and claims priority from, Taiwan Patent Application Serial Number 100139038, filed on Oct. 27, 2011, the disclosure of which is hereby incorporated by reference herein in its entirety.

BACKGROUND

1. Technical Field

The present invention relates to an optical touch system.

2. Related Art

In optical touch systems, image sensors capture pictures having object images. The touch systems then analyze the positions of the object images of pictures, and calculate coordinates of the objects by the positions of the object images and some geometric dimensions of the touch systems.

U.S. Pat. No. 4,782,328 discloses a touch screen system comprising two sensors and a processor coupled with the two sensors. The sensors are used to capture images of an object on a touch screen. The processor analyzes the images, determines sensing paths respectively connecting the object and the two sensors, and calculates the coordinates of the object by the sensing paths.

Multi-touch systems allow users to simultaneously use at least one finger to interact with displayed content. With the multi-touch systems, users can move at least one finger on touch screens to generate corresponding gesture commands to control the displayed content. For example, moving a finger can scroll up or down lists or tables. Thus, the operation of moving a finger is called a scroll gesture. Pinching or reverse pinching can zoom out or in displayed content. Rotating gestures (i.e., moving an index finger around a thumb) can rotate an image.

Multi-touch applications can adopt an event driven model as their basic conceptual designs. After a computing system captures a touch event, a registered event handler is called to implement a desired functionality.

In optical multi-touch systems, when two fingers are applied, a picture generated by an image sensor will have two finger images. A corresponding gesture can be determined by analyzing pictures generated at multiple time points. When two fingers are too close to each other, a generated picture may show one image. Under such a circumstance, the touch system may incorrectly determine that the operation is performed by a single finger and calculate coordinates, resulting in incorrect coordinates or an incorrectly determined gesture.

SUMMARY

One embodiment of the present invention provides an optical touch system comprising a first imaging device and a computing device. The first imaging device is directed toward a side surface of a target on a touch surface. The first imaging device can generate, in sequence, a first picture comprising an image of the target and a second picture comprising an image of the target. The computing device is configured to calculate a first dimension that represents the target at the time when the first picture is taken using the first picture and a second dimension that represents the target at the time when the second picture is taken using the second picture. The computing device can determine whether the target is formed by one object or two objects by the first and second dimensions.

Another embodiment of the present invention discloses an optical touch system, which may comprise a first imaging device, a second imaging device, and a computing device. The first imaging device is directed toward a side surface of a target and can generate a first picture comprising an image of the target. The second imaging device is directed toward another side surface of the target and can generate a second picture comprising an image of the target. The computing device is configured to calculate a first radius of a first imaginary circle representing the target using the first picture, a second radius of a second imaginary circle representing the target using the second picture, and to determine whether the target is formed by one object or two objects by the first and second radii.

Another embodiment of the present invention discloses an optical touch system, which comprises a first imaging device, a second imaging device, a third imaging device, and a computing device. The first imaging device is directed toward a first side surface of a target and can generate a first picture comprising an image of the target. The second imaging device is directed toward a second side surface of the target and can generate a second picture comprising an image of the target. The third imaging device is directed toward a third side surface of the target and can generate a third picture comprising an image of the target. The computing device is configured to calculate a first radius of a first imaginary circle representing the target using the first picture, a second radius of a second imaginary circle representing the target using the second picture, a third radius of a third imaginary circle representing the target using the third picture, and to determine whether the target is formed by one object or two objects by the first, second, and third radii.

To provide a better understanding of the above-described objectives, characteristics and advantages of the present invention, a detailed explanation is provided in the following embodiments with reference to the drawings.

BRIEF DESCRIPTION OF THE DRAWINGS

The invention will be described according to the appended drawings in which:

FIG. 4 is an illustration of a picture generated by a first imaging device according to one embodiment of the present invention;

FIG. 5 is an illustration of a picture generated by a second imaging device according to one embodiment of the present invention;

FIGS. 9 and 10 are illustrations demonstrating pictures generated by an imaging device at different times, respectively, according to one embodiment of the present invention;

FIGS. 11 and 12 are illustrations demonstrating pictures generated by another imaging device at different times, respectively, according to one embodiment of the present invention;

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Figure 1:
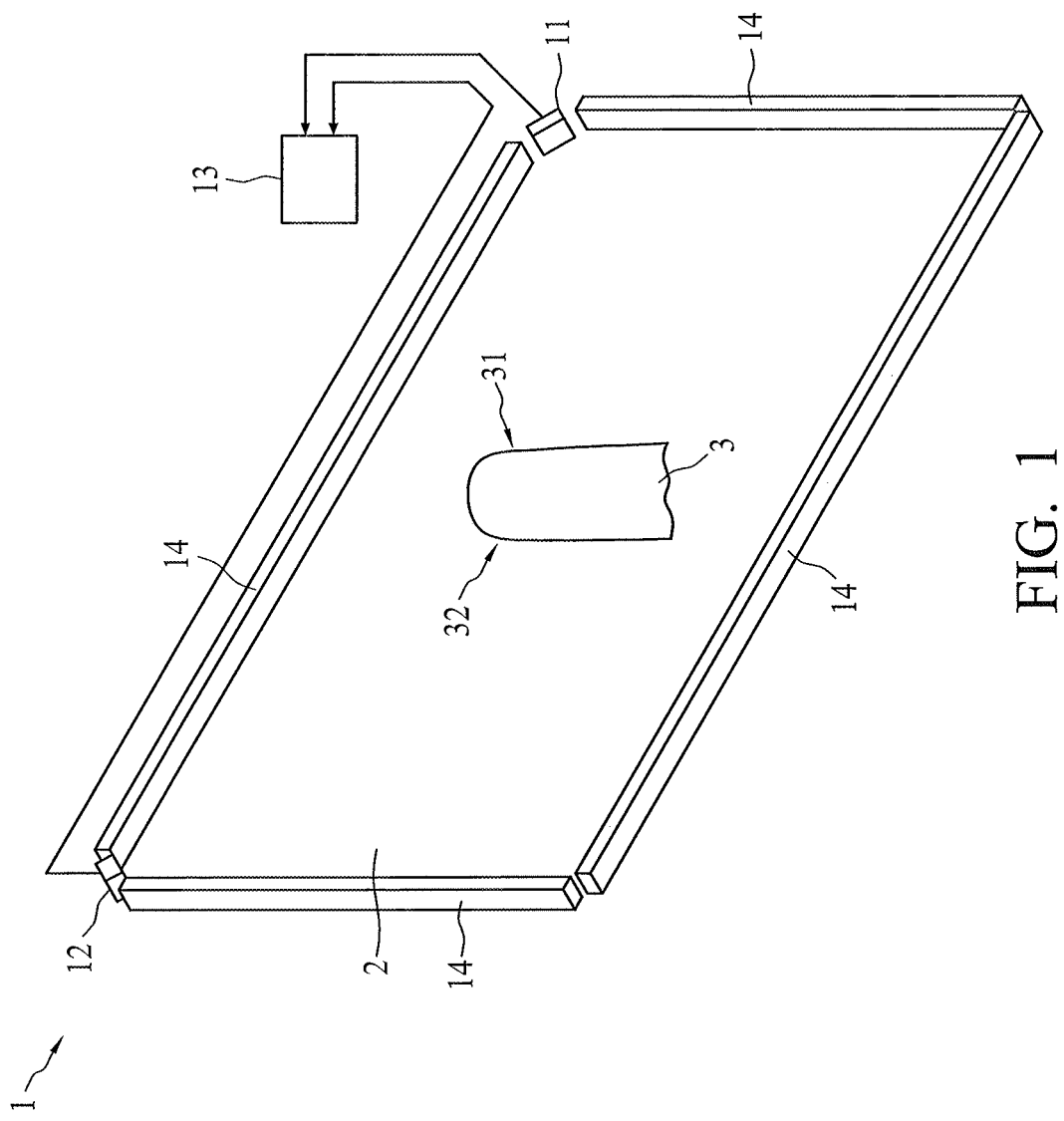
FIG. 1 is an illustration schematically depicting an optical touch system according to one embodiment of the present invention.

FIG. 1 is an illustration schematically depicting an optical touch system 1 according to one embodiment of the present invention. The optical touch system 1 comprises a first imaging device 11, a second imaging device 12, and a computing device 13. The first imaging device 11 is configured to be directed toward a side surface 31 of a target 3 to be sensed, which is on a touch surface 2, and the second imaging device 12 is configured to be directed toward another side surface 32 of the target 3 such that the first imaging device 11 and the second imaging device 12 can take pictures of the target 3 from different angles. The computing device 13 is coupled with the first imaging device 11 and the second imaging device 12 in order to analyze the images formed by the target 3 on pictures generated by the first imaging device 11 and the second imaging device 12.

The target 3 can move on the touch surface 2, thereby generating corresponding touch events. The target 3 can form an image on each of the pictures generated by the first imaging device 11 and the second imaging device 12. The target 3 can be formed by a single object. The target 3 may comprise two objects, wherein the two objects may be close to each other or separate from each other. The object may be a stylus, a finger, or other objects that can be used in optical touch systems for input.

In one embodiment, the touch surface 2 can be rectangular, and the first imaging device 11 and the second imaging device 12 are disposed at two adjacent corners of the touch surface 2 with their sensing surfaces facing toward the touch surface 2. In one embodiment, the optical touch system 1 may further comprise at least one light-projecting member 14 that is disposed adjacent to an edge of the touch surface 2. The light-projecting member 14 may comprise a reflector or an active light emitting device. The light-projecting member 14 may comprise a plurality of active light emitting devices such as light emitting diodes. The light-projecting member 14 may comprise a combination of a light guide and an active light emitting device.

Figure 2:
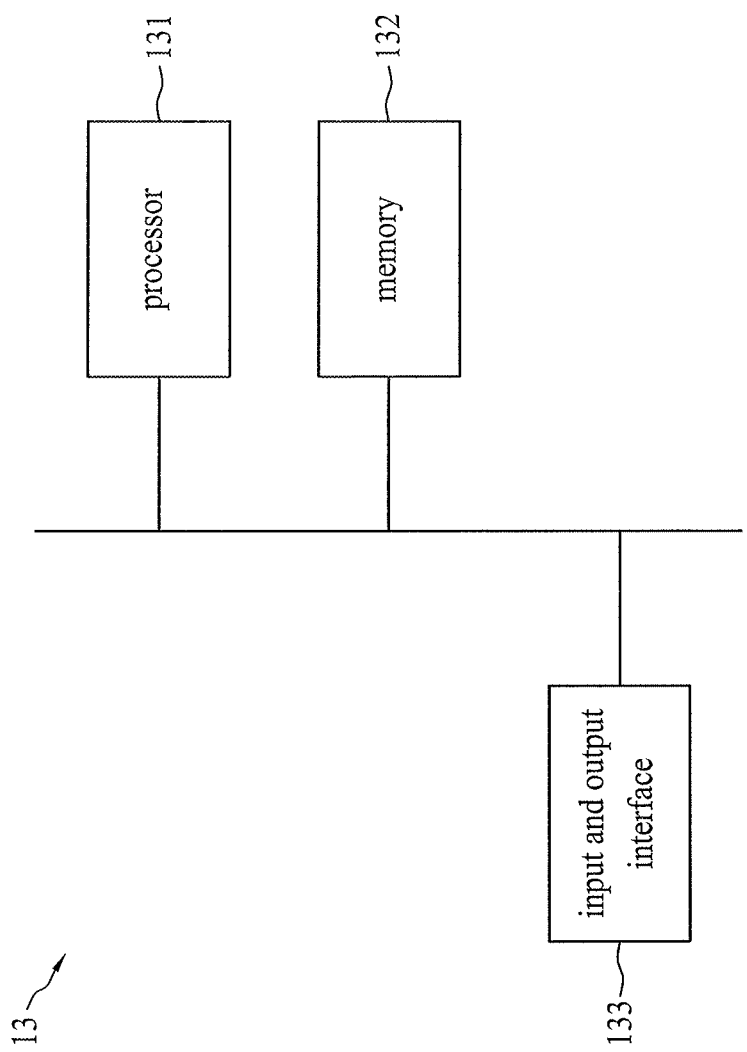
FIG. 2 is an illustration schematically depicting a computing device according to one embodiment of the present invention.

FIG. 2 is an illustration schematically depicting a computing device 13 according to one embodiment of the present invention. As shown in FIG. 2, the computing device 13 may comprise a processor 131, a memory 132, and an input and output interface 133. The processor 131, the memory 132, and the input and output interface 133 can be coupled together. The input and output interface 133 may be coupled with the first imaging device 11 and the second imaging device 12 such that the computing device 13 can receive pictures generated by the first imaging device 11 and the second imaging device 12. The memory 132 may store programs executed by the processor 131 and data required for the execution. The memory 312 may comprise a dynamic random access memory.

Figure 3:
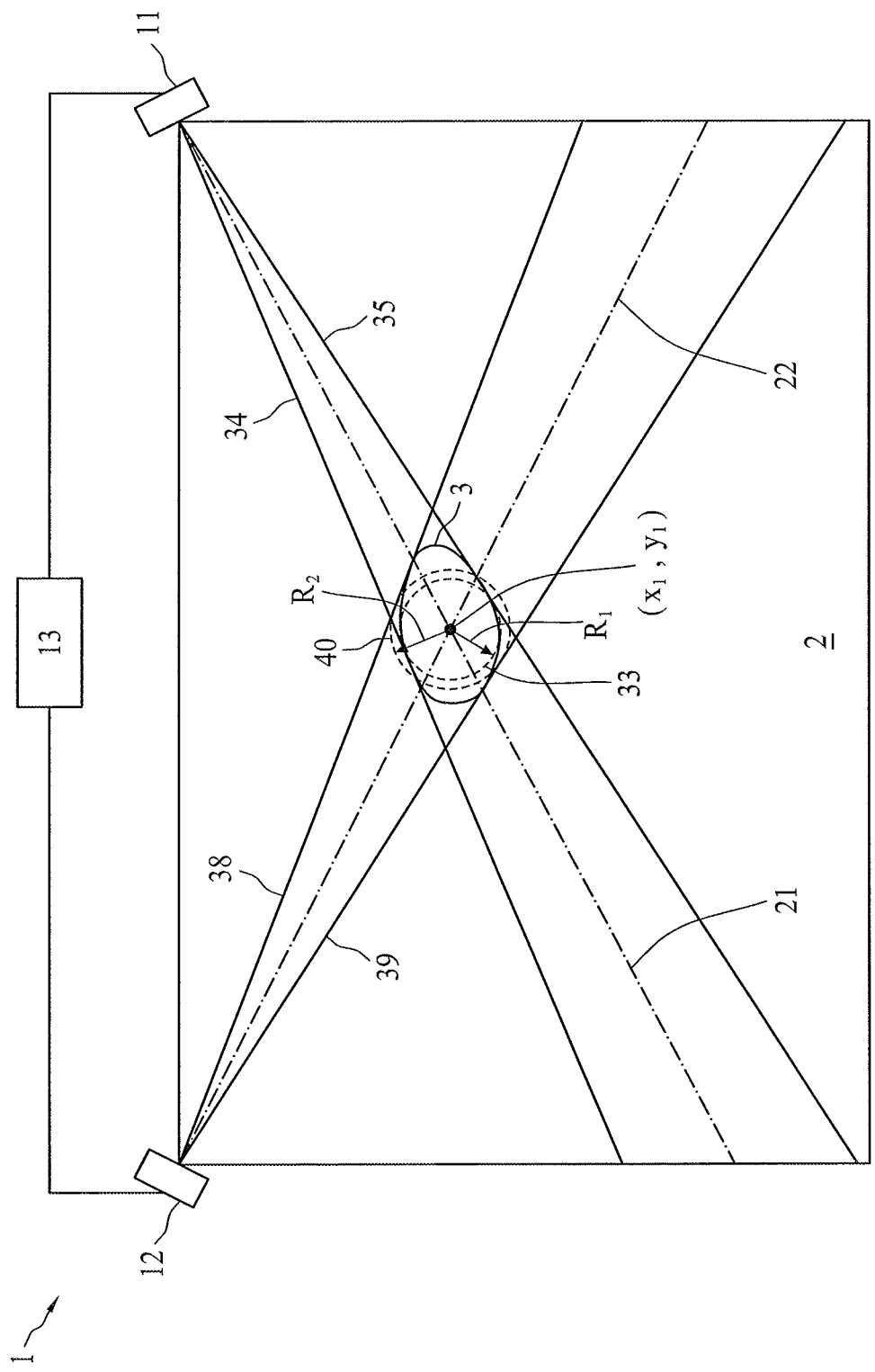
FIG. 3 is an illustration for demonstrating the method for calculating dimensions of a target on a touch surface of an optical touch system according to one embodiment of the present invention.

Referring to FIGS. 1, 3, and 4, when the target 3 is on the touch surface 2, the first imaging device 11 may generate a picture 4, which comprises an image 41 formed by the target 3, and the second imaging device 12 may generate a picture 5, which comprises an image 51 formed by the target 3.

The computing device 13 may analyze the picture 4 to obtain a first dimension representing the target 3 under the monitoring of the first imaging device 11. In one embodiment, the first dimension can be a width 42 of the image 41 formed by the target 3 on the picture 4. In another embodiment, the first dimension can be the radius ($R_1$) of an imaginary circle 33, which is calculated according to the image 41 of the picture 4, wherein the imaginary circle 33 is tangent to vision lines 34 and 35. The vision line 34 or 35 is an imaginary line separating a bright region from a dark region. Each vision line 34 or 35 may correspond to a boundary of the image 41 of the picture 4. The vision line 34 or 35 can be determined by the location of the corresponding boundary of the image 41 on the picture 4 and the focus position of the first imaging device 11. The radius ($R_1$) of the imaginary circle 33 can be obtained by determining a distance from coordinate data ($x_1$, $y_1$) representing the target 3 to the vision line 34 or 35. The representative coordinate data ($x_1$, $y_1$) can be obtained by determining the intersection of the viewing line 21 extending from the first imaging device 11 toward the center of the target 3 and the viewing line 22 extending from the second imaging device 12 toward the center of the target 3, wherein the viewing line 21 can be determined using the image 4 captured by the first imaging device 11 and the viewing line 22 can be determined using the image 5 captured by the second imaging device 12. Regarding the calculation of the representative coordinate data ($x_1$, $y_1$), please refer to U.S. Pat. No. 4,782,328, which is incorporated herein by reference, and the present disclosure is not limited to such a method.

Similarly, the computing device 13 may analyze a picture 5 to obtain a second dimension representing the target 3 under the monitoring of the second imaging device 12. In one embodiment, the second dimension can be a width 43 of the image 51 formed by the target 3 on the picture 5. In another embodiment, the second dimension can be the radius ($R_2$) of an imaginary circle 40, which is calculated according to the image 51 of the picture 5, wherein the imaginary circle 40 is tangent to vision lines 38 and 39. The corresponding vision line 38 or 39 can be determined by the location of the boundary of the image 51 on the picture 5 and the focus position of the second imaging device 12. The radius ($R_2$) of the imaginary circle 40 can be obtained by determining a distance from coordinate data ($x_1$, $y_1$) representing the target 3 to the vision line 38 or 39.

In one aspect of the present disclosure, the optical touch system can determine whether the target is performing gestures according to the change of dimensions representing a target obtained at different times.

Figure 6:
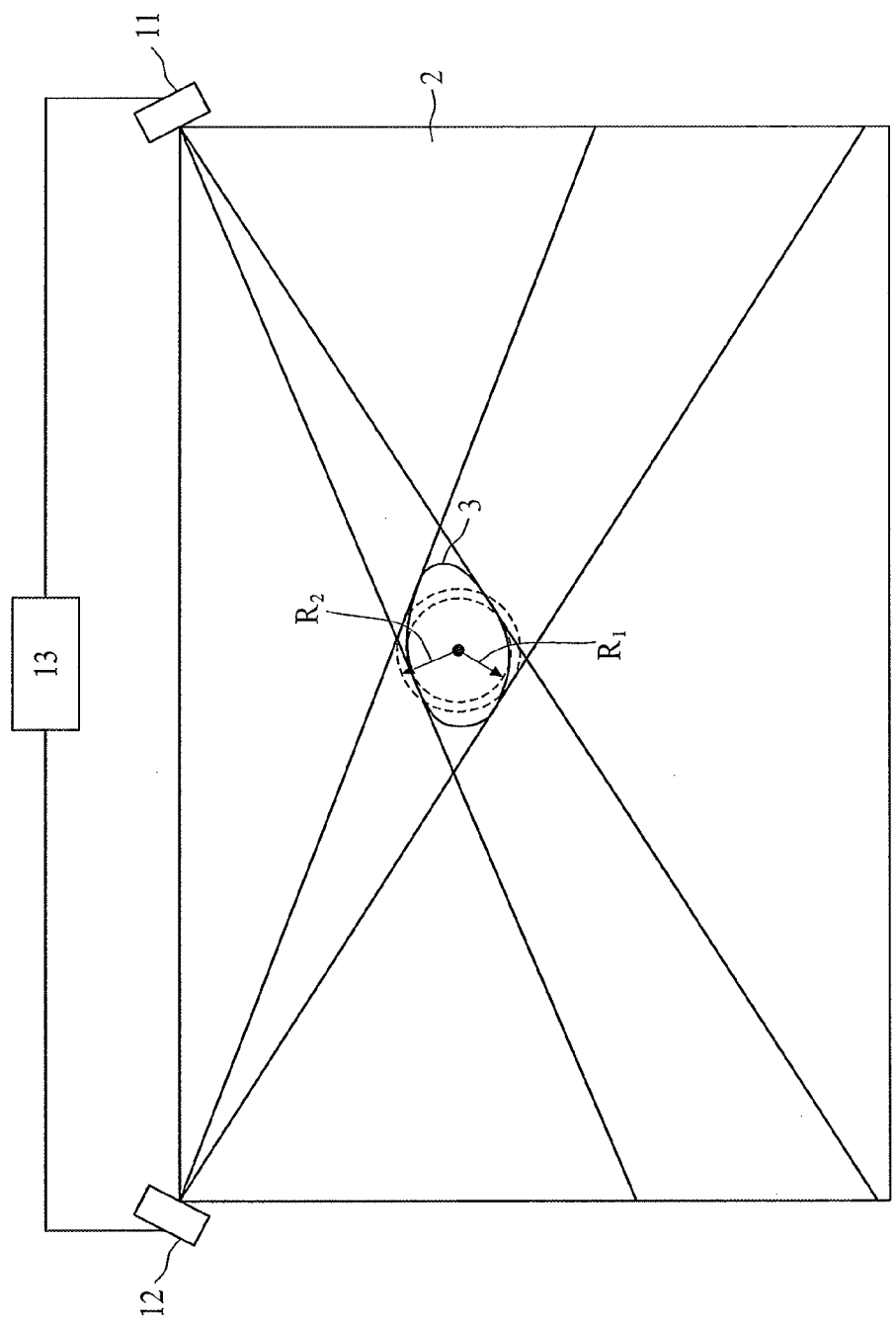
FIGS. 6 and 7 are illustrations depicting the statuses of a target on a touch surface at different times, respectively, according to one embodiment of the present invention.
Figure 7:
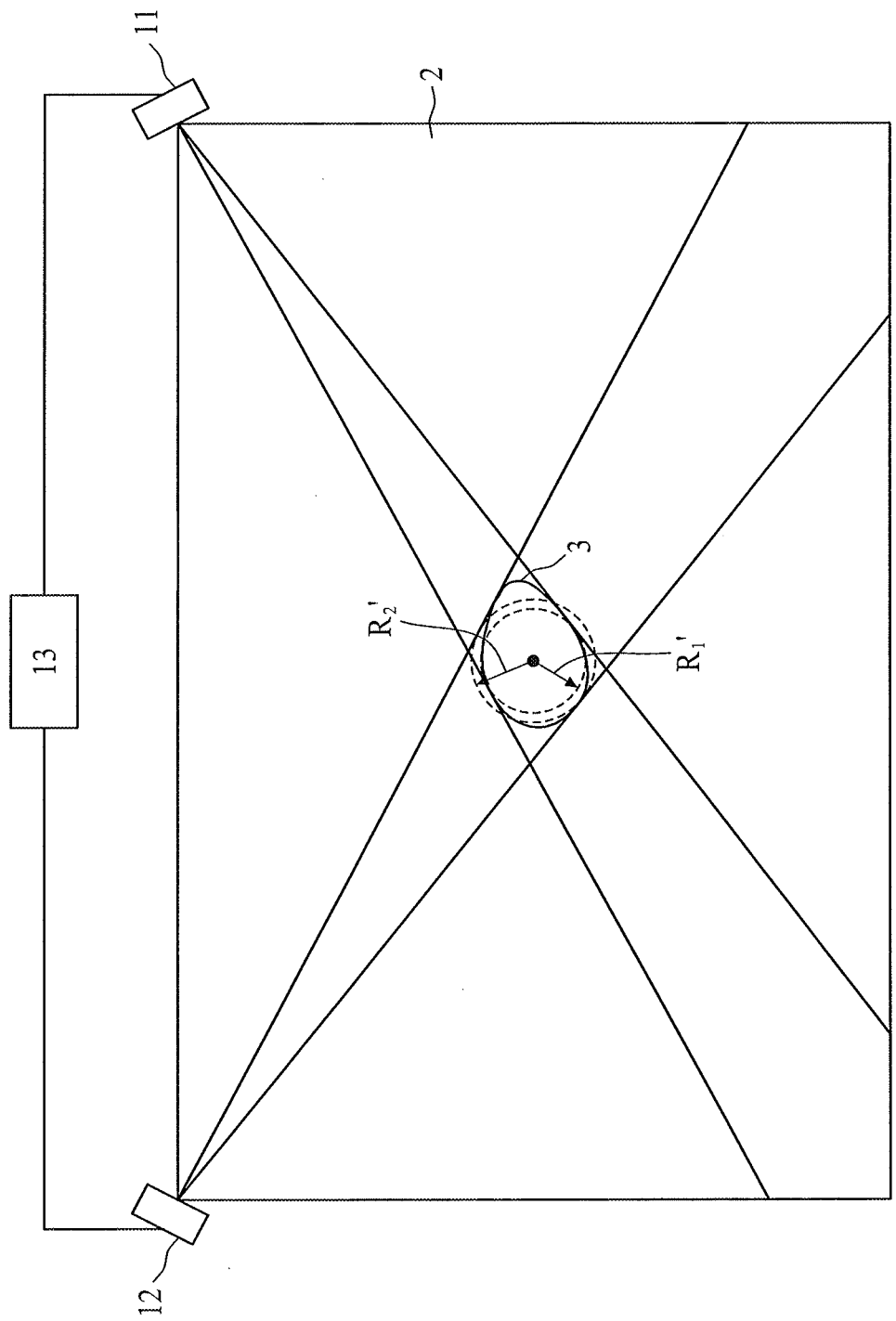

FIGS. 6 and 7 are illustrations depicting the statuses of a target 3 on a touch surface 2 at different times, respectively, according to one embodiment of the present invention. Referring to FIGS. 6 and 7, at time T, the target 3 is at the status as shown in FIG. 6. The computing device 13 determines the radius ($R_1$) of an imaginary circle representing the target 3 using the image captured by the first imaging device 11 at time T. Similarly, the computing device 13 may also determine the radius ($R_2$) of another imaginary circle representing the target 3 using the image captured by the second imaging device 12 at time T.

At time T+N, the target 3 is at the status as shown in FIG. 7. The computing device 13 determines the radius ($R_1'$) of an imaginary circle representing the target 3 using the image captured by the first imaging device 11 at time T+N. Similarly, the computing device 13 can also determine the radius ($R_2'$) of another imaginary circle representing the target 3 using the image captured by the second imaging device 12 at time T+N.

The computing device 13 is configured to calculate a ratio ($R_1'/R_1$) of the radius ($R_1'$), obtained at time T+N, to the radius ($R_1$), obtained at time T, and to calculate a ratio ($R_2'/R_2$) of the radius ($R_2'$), obtained at time T+N, to the radius ($R_2$), obtained at time T. The computing device 13 is configured to then compare the ratio ($R_1'/R_1$) with a threshold and compare the ratio ($R_2'/R_2$) with a threshold. In one embodiment, when the ratio ($R_1'/R_1$) is less than a threshold ($Th_1$) and/or the ratio ($R_2'/R_2$) is less than the threshold ($Th_1$), the target 3 is considered as being formed by a single object. Under such a circumstance, the computing device 13 will determine the coordinate data of the target 3.

In another embodiment, the computing device 13 may compute a ratio ($L_1'/L_1$) of a width ($L_1'$) of the image formed by the target 3 on the picture generated at time T+N by the first imaging device 11 to a width ($L_1$) of the image formed by the target 3 on the picture generated at time T by the first imaging device 11, and compute a ratio ($L_2'/L_2$) of a width ($L_2'$) of the image formed by the target 3 on the picture generated at time T+N by the second imaging device 12 to a width ($L_2$) of the image formed by the target 3 on the picture generated at time T by the second imaging device 12. The computing device 13 then compares the two ratios ($L_1'/L_1$, $L_2'/L_2$) with a threshold. When one of the two ratios ($L_1'/L_1$, $L_2'/L_2$) is or both the two ratios ($L_1'/L_1$, $L_2'/L_2$) are less than the threshold, the computing device 13 determines the coordinate data of the target 3.

In one embodiment, when the widths ($L_1$, $L_1'$, $L_2$, $L_2'$) of the image satisfy the following equation (1), the target 3 will be considered as being formed by a single object, and the computing device 13 outputs the coordinate data of the target 3.

$$\frac{\max(L_1, L_1')}{\min(L_1, L_1')} < Th1, \frac{\max(L_2, L_2')}{\min(L_2, L_2')} < Th1 \qquad (1)$$

where $\max(L_1, L_1')$ represents the larger of the two widths ($L_1$, $L_1'$), $\max(L_2, L_2')$ represents the larger of the two widths ($L_2$, $L_2'$), $\min(L_1, L_1')$ represents the lesser of the two widths ($L_1$, $L_1'$), $\min(L_2, L_2')$ represents the lesser of the two widths ($L_2$, $L_2'$), and Th1 is a predetermined threshold.

In another embodiment, when the radii ($R_1'$ and $R_2'$) obtained at time T+N satisfy the following equation (2), the target 3 will be considered as being formed by a single object.

$$\frac{\max(R_1', R_2')}{\min(R_1', R_2')} < Th2 \qquad (2)$$

where $\max(R_1', R_2')$ represents the larger of the two radii ($R_1'$ and $R_2'$), $\min(R_1', R_2')$ represents the lesser of the two radii ($R_1'$ and $R_2'$), and Th2 is a predetermined threshold.

In particular, the picture generated at time T+N is a picture that is generated after a sampling time N from time T.

Figure 8:
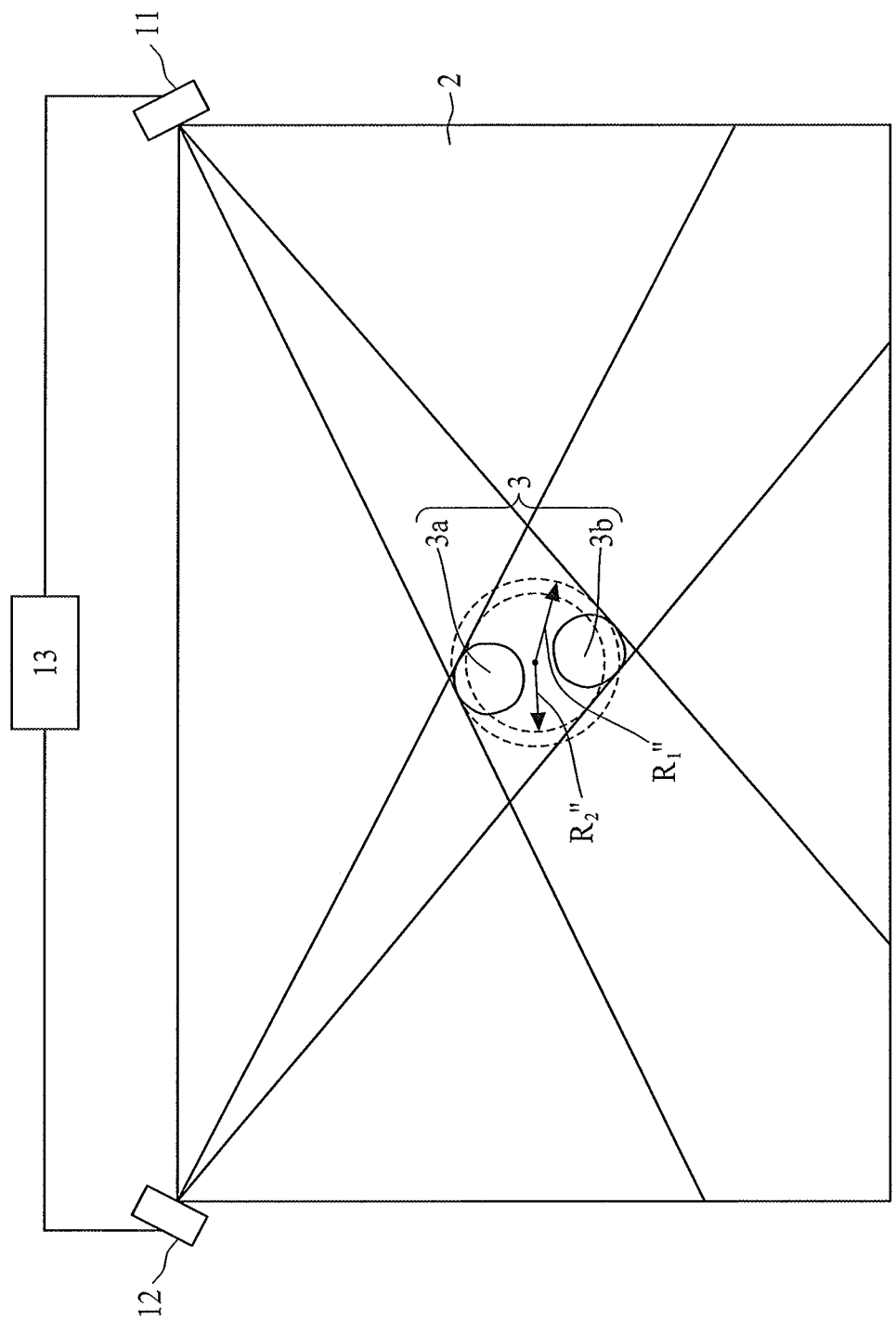
FIG. 8 is an illustration depicting another status of a target on a touch surface according to one embodiment of the present invention.

FIG. 8 is an illustration depicting another status of a target 3 on a touch surface 2 according to one embodiment of the present invention. Referring to FIGS. 6 and 8, in another embodiment, a status, as shown in FIG. 6, of the target 3 on the touch surface 2 at time T is changed to another status, as shown in FIG. 8, of the target 3 on the touch surface 2 at time T+N. After time T, the computing device 13 determines the radius ($R_1$) of an imaginary circle representing the target 3 using the image captured by the first imaging device 11 at time T. Similarly, the computing device 13 also determines the radius ($R_2$) of another imaginary circle representing the target 3 using the image captured by the second imaging device 12 at time T.

After time T+N, the computing device 13 determines the radius ($R_1''$) of an imaginary circle representing the target 3 using the image captured by the first imaging device 11 at time T+N. Similarly, the computing device 13 determines the radius ($R_2''$) of another imaginary circle representing the target 3 using the image captured by the second imaging device 12 at time T+N.

The computing device 13 calculates a ratio ($R_1''/R_1$) of the radius ($R_1''$), obtained at time T+N, to the radius ($R_1$), obtained at time T, and to calculate a ratio ($R_2''/R_2$) of the radius ($R_2'$), obtained at time T+N, to the radius ($R_2$), obtained at time T. The computing device 13 then compares the ratio ($R_1''/R_1$) with a threshold and compare the ratio ($R_2''/R_2$) with a threshold. In one embodiment, if the ratio ($R_1''/R_1$) is less than a threshold and the ratio ($R_2''/R_2$) is larger than the threshold, if the ratio (R1"/R1) is greater than the threshold and the ratio ($R_2''/R_2$) is less than the threshold, or if the ratio (R1"/R1) is greater than the threshold and the ratio (R2"/R2) is greater than the threshold, then the target 3 will be considered as being formed by two objects 3a and 3b, and then the computing device 13 may determine the coordinate data of the object 3a and the coordinate data of the object 3b, or a gesture performed by the target 3.

In one embodiment, when the radii (R1" and R2") obtained at time T+N satisfy the following equation (3), the target 3 will be considered as two objects.

$$\frac{\max(R_1'', R_2'')}{\min(R_1'', R_2'')} > Th3 \qquad (3)$$

where Th3 is a predetermined threshold.

In one embodiment, when the radii (R1" and R2") obtained at time T+N and the radii (R1 and R2) obtained at time T satisfy the following equation (4), the target 3 will be considered as two objects.

$$\max(R_1''-R_1, R_2''-R_2) > Th4 \qquad (4)$$

where Th4 is a predetermined threshold.

In one embodiment, when the radii (R1" and R2") obtained at time T+N satisfy the following equation (5), the target 3 will be considered as two objects.

$$\max(R_1'', R_2'') > Th5 \quad (5)$$

where Th5 is a predetermined threshold.

In another embodiment, the first imaging device 11 generates a picture 9, as shown in FIG. 9, at time T, wherein the picture 9 comprises an image 91 created by the target 3. The second imaging device 12 generates a picture 110, as shown in FIG. 11, at time T, wherein the picture 110 comprises an image 111 created by the target 3. The first imaging device 11 generates a picture 10, as shown in FIG. 10, at time T+N, wherein the picture 10 comprises an image 101 created by the target 3. The second imaging device 12 generates a picture 120, as shown in FIG. 12, at time T+N, wherein the picture 120 comprises an image 121 created by the target 3. The computing device 13 determines a ratio ($L_1'/L_1$) of a width ($L_1'$) of the image 101 to a width ($L_1$) of the image 91 and a ratio ($L_2'/L_2$) of a width ($L_2'$) of the image 121 to a width ($L_2$) of the image 111. In one embodiment, when the ratio ($L_2'/L_2$) or the ratio ($L_1'/L_1$) is greater than a threshold, the target 3 comprises two objects 3a and 3b. In one embodiment, when the ratio ($L_2'/L_2$) and the ratio ($L_1'/L_1$) are both greater than a threshold, the target 3 comprises two objects 3a and 3b.

In one embodiment, referring to FIGS. 9 to 12, the target 3 comprises two objects 3a and 3b. Since the two objects 3a and 3b are close to each other, the two objects 3a and 3b form overlapped images (91, 101, 111, and 121) on the pictures (9, 101, 111, and 121), wherein the portion between two corresponding dotted lines indicates the overlapped part.

In one embodiment, when the widths ($L_1'$ and $L_2'$) and the widths ($L_1$ and $L_2$) satisfy the following equation (6), the target 3 will be considered as comprising two objects.

$$\max(L_1' - L_1, L_2' - L_2) > Th6 \quad (6)$$

where Th6 is a predetermined threshold.

In one embodiment, when the widths ($L_1'$ and $L_2'$) and the widths ($L_1$ and $L_2$) satisfy the following equation (7), the target 3 will be considered as comprising two objects.

$$\begin{cases} L_1' > L_1, L_2' > L_2, \dfrac{L_1'}{L_1} < Th7, \dfrac{L_2'}{L_2} > Th7 \\ L_1' > L_1, L_2' > L_2, \dfrac{L_1'}{L_1} > Th7, \dfrac{L_2'}{L_2} < Th7 \\ L_1' > L_1, L_2' > L_2, \dfrac{L_1'}{L_1} > Th7, \dfrac{L_2'}{L_2} > Th7 \\ L_1' > L_1, L_2' > L_2, \max(L_1' - L_1, L_2' - L_2) > Th8 \end{cases} \quad (7)$$

where Th7 and Th8 are predetermined thresholds.

In some situations, it can determine whether the target 3 comprises a single object or a plurality of objects according to a plurality of pictures obtained at the same time.

Figure 13:
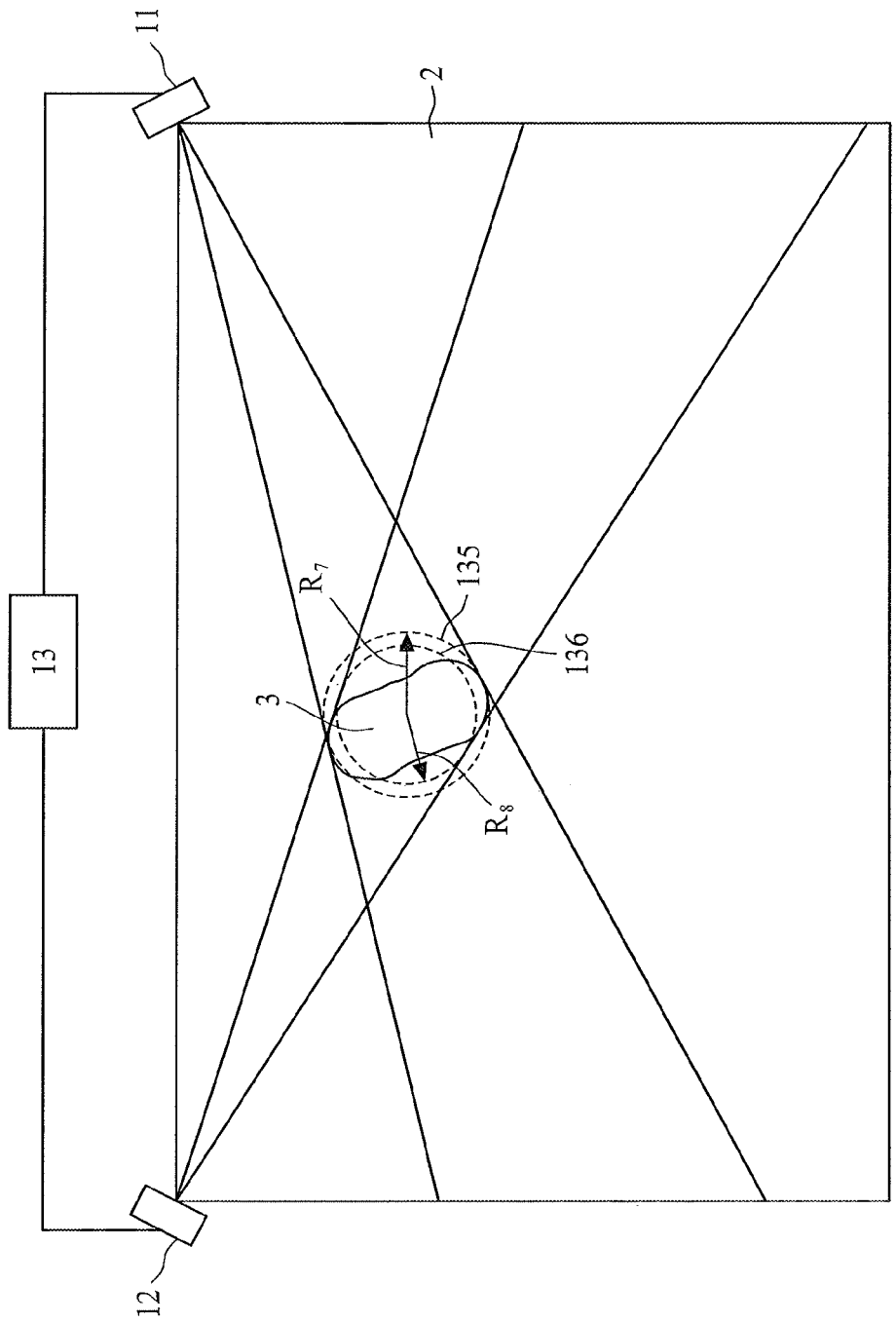
FIG. 13 is an illustration depicting a status of a target on a touch surface according to another embodiment of the present invention.

FIG. 13 is an illustration depicting a status of a target 3 on a touch surface 2 according to another embodiment of the present invention. Referring to FIG. 13, the first imaging device 11 generates a picture at time T and determines a radius ($R_7$) of an imaginary circle 135 according to the picture. The second imaging device 12 also generates a picture at time T and determines a radius ($R_8$) of an imaginary circle 136 according to the picture. The computing device 13 next determines the larger of the radii ($R_7$ and $R_8$) and the lesser of the radii ($R_7$ and $R_8$), and determines a ratio of the larger to the lesser. When the ratio (the larger/the lesser) is less than a threshold, the target 3 is considered as being formed by a single object. When the ratio (the larger/the lesser) is greater than a threshold, the target 3 is considered as being formed by two objects.

In another embodiment, when the larger of the radii ($R_7$ and $R_8$) is greater than a threshold, the target 3 is considered as being formed by two objects.

In one aspect of the present disclosure, whether the target is formed by a single object or a plurality of objects is determined by the shape of the target. If the target is a single object and has a shape with substantially similar cross-sectional dimensions, similar dimensions can be obtained when the target is observed from various angles for determining dimensions representing the target. If the target is formed by a plurality of objects, the target will no longer have a shape with substantially similar cross-sectional dimensions because, from some angles, only a single object can be seen and from other angles, multiple objects can be seen. Under such circumstance, different dimensions can be obtained.

In another aspect of the present disclosure, whether the target is formed by one object or a plurality of objects can be determined by observing the change of the shape of the target from one time to another. When the target comprises a plurality of objects and the objects are performing gestures, multiple objects can be observed later with the movement of the objects, although one object is observed at a time point because the objects are concealed from each other. Under such circumstance, different dimensions can be obtained at different time points.

Figure 14:
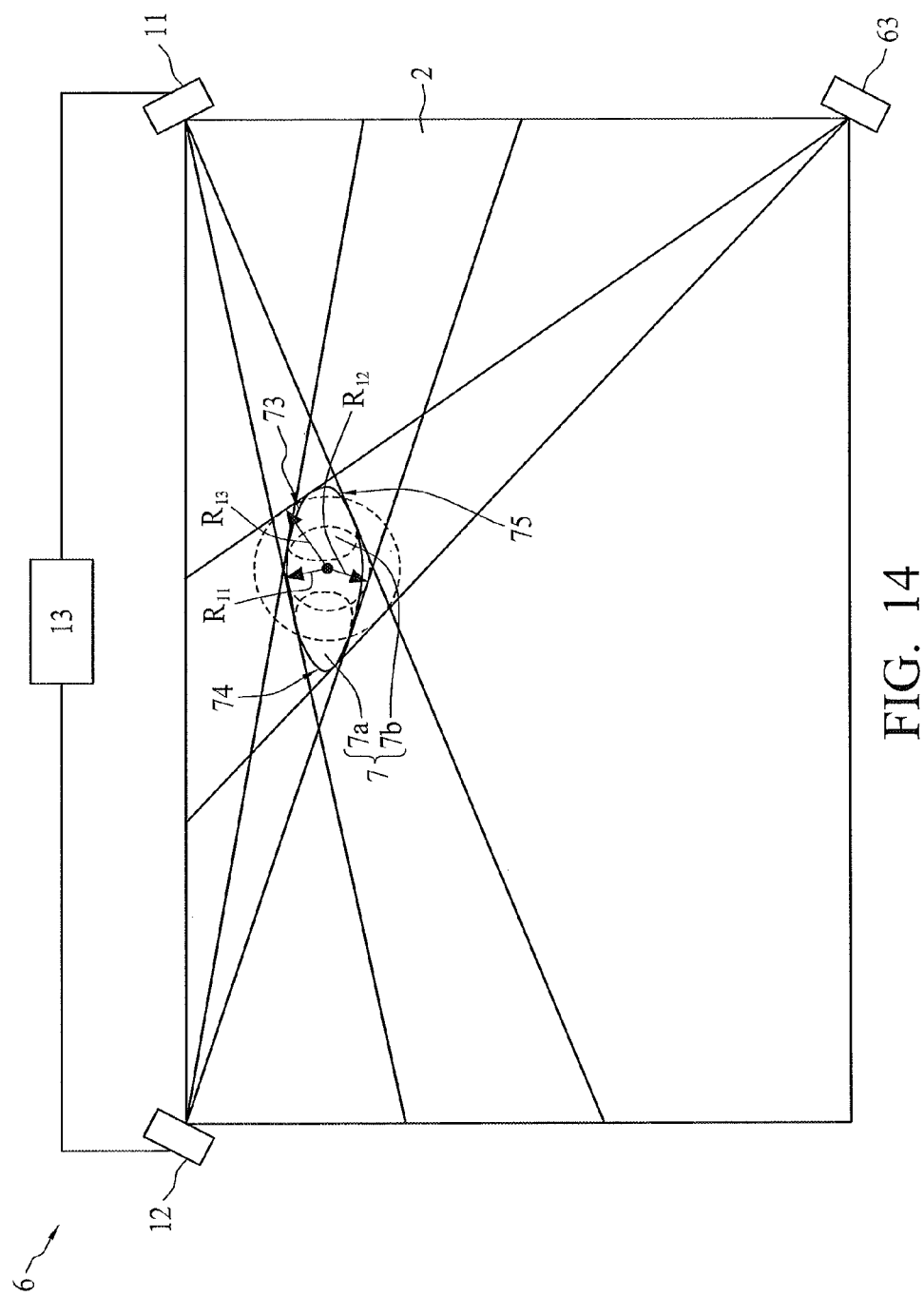
FIG. 14 is an illustration of an optical touch system according to another embodiment of the present invention.

FIG. 14 is an illustration of an optical touch system 6 according to another embodiment of the present invention. Referring to FIG. 14, the optical touch system 6 comprises a first imaging device 11, a second imaging device 12, a third imaging device 63, and a computing device 13. The first imaging device 11 is configured to be directed toward a first side surface 73 of a target 7, the second imaging device 12 is configured to be directed toward a second side surface 74 of the target 7, and the third imaging device 63 is configured to be directed toward a third side surface 75 of the target 7. Since the first imaging device 11, the second imaging device 12, and the third imaging device 63 face different side surfaces of the target 7, images of the target 7 can be acquired from different directions.

The computing device 13 can determine a radius ($R_{11}$) of an imaginary circle representing the target 7 according to the image of the picture generated by the first imaging device 11, a radius ($R_{12}$) of an imaginary circle representing the target 7 according to the image of the picture generated by the second imaging device 12, and a radius ($R_{13}$) of an imaginary circle representing the target 7 according to the image of the picture generated by the third imaging device 63. The computing device 13 can further determine the largest and the least of the radii ($R_{11}$, $R_{12}$, and $R_{13}$) and calculate a ratio of the largest to the least and compare the ratio with a threshold. When the ratio is less than the threshold, the target 7 will be considered as being formed by a single object. When the ratio is greater than the threshold, the target 7 will be considered as being formed by two objects.

In another embodiment, the computing device 13 may compare the largest of the radii ($R_{11}$, $R_{12}$, and $R_{13}$) with a threshold. When the largest is greater than the threshold, the computing device 13 may consider the target 5 as being formed by two objects performing gestures.

Particularly, in the embodiment of FIG. 14, although the target 7 is formed by two objects 7a and 7b and has a shape similar to an ellipse, because the two objects 7a and 7b are transversely aligned, the image of the picture generated by the first imaging device 11 has a width similar to that of the image of the picture generated by the second imaging device 12. As a result, the radius ($R_{11}$) of the imaginary circle is similar to the radius ($R_{12}$) of the imaginary circle. It can be observed that using the image of the picture generated by the first imaging device 11 and the image of the picture generated by the second imaging device 12 cannot correctly determine that the target 7 is formed by the two objects 7a and 7b. The addition of a third imaging device 63 and a proper arrangement of the first imaging device 11, the second imaging device 12, and the third imaging device 63 can reveal the portion of the target having a different dimension, thus reducing such incorrect determinations by using three imaging devices as opposed to using two.

Figure 15A:
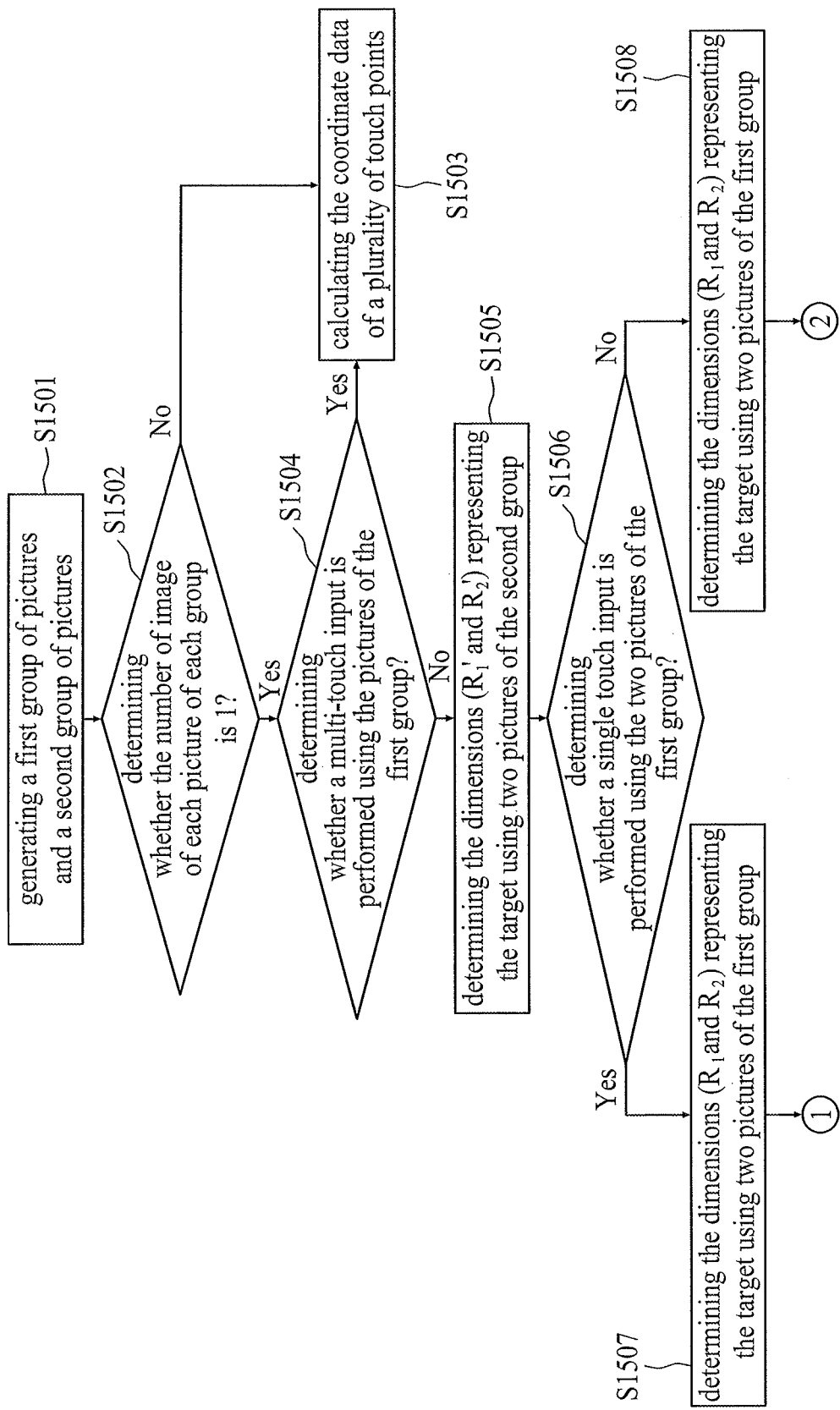
FIGS. 15A and 15B are flow charts showing the steps of a determination method for multi-touch operations according to one embodiment of the present invention.
Figure 15B:
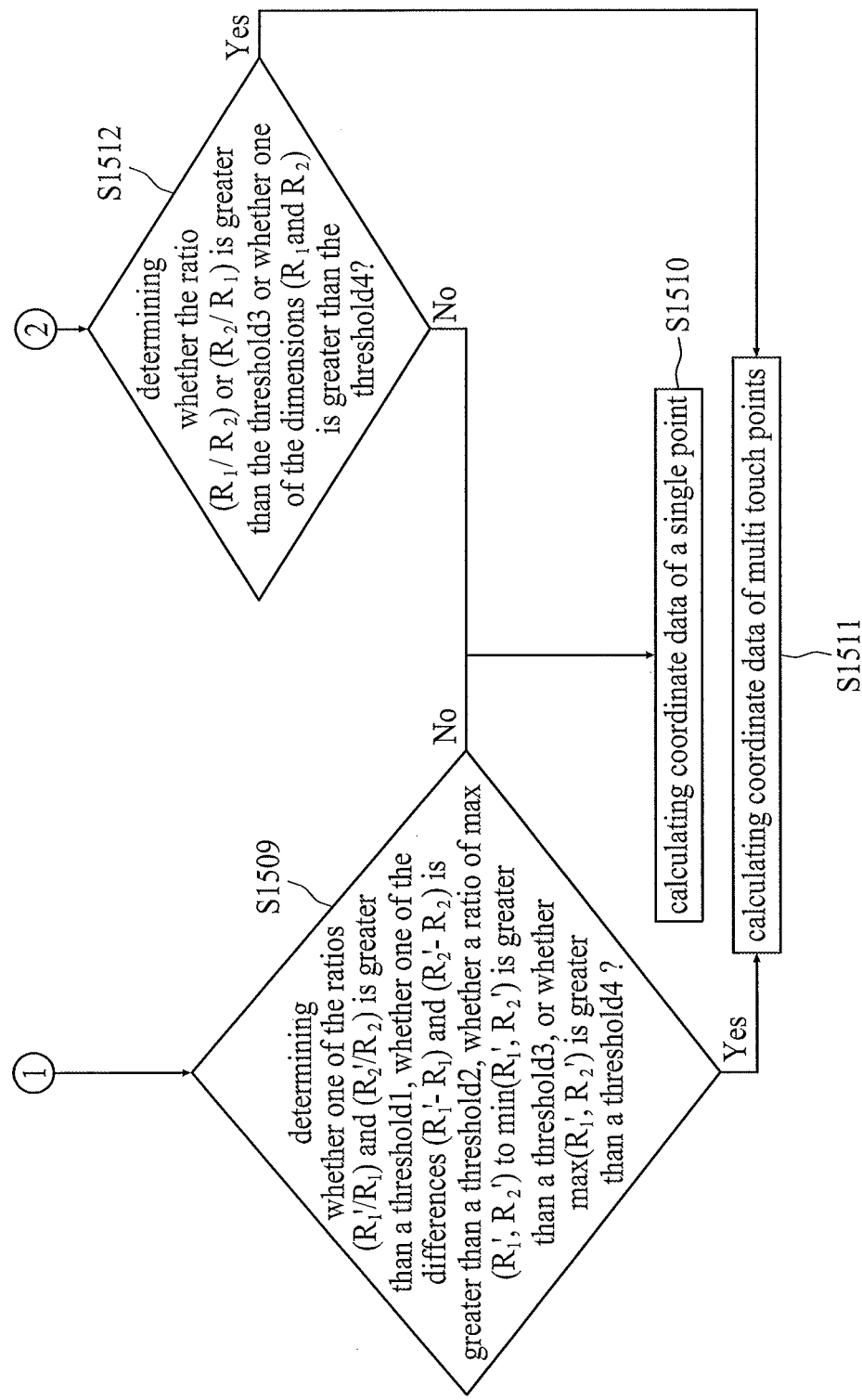

FIGS. 15A and 15B are flow charts showing the steps of a determination method for multi-touch operations according to one embodiment of the present invention. Referring to FIGS. 15A and 15B, in Step S1501, the two imaging devices sequentially and respectively generate a first group of two pictures and a second group of two pictures.

In Step S1502, it is determined whether the number of images of each picture of each group is 1. If not, then Step S1503 is performed, in which coordinate data of the plurality of touch points is calculated. If yes, then Step S1504 is performed.

In Step S1504, it is verified whether a multi-touch input is performed by using the pictures of the first group. If yes, then Step S1503 is performed, in which the coordinate data of the plurality of touch points is calculated. If not, then Step S1505 is performed.

In Step S1505, the dimensions ($R_1$' and $R_2$') representing the target are respectively determined using two pictures of the second group, wherein the dimensions ($R_1$' and $R_2$') can be radii of imaginary circles obtained using the images of the two pictures.

In Step S1506, it is verified whether a single touch input is performed by using the two pictures of the first group. If yes, then Step S1507 is performed; otherwise, Step S1508 is performed.

In Step S1507, the dimensions ($R_1$ and $R_2$) representing the target are respectively determined using two pictures of the first group, wherein the dimensions ($R_1$ and $R_2$) can be radii of imaginary circles obtained using the images of the two pictures.

In Step S1509, one of the following conditions (1) to (4) is used to determine whether a single point coordinate data or multi-point coordinate data is calculated:

(1) It is determined whether one of the ratios ($R_1$'/$R_1$) and ($R_2$'/$R_2$) is greater than a threshold1. If yes, then Step S1511 is performed, in which coordinate data of multi-touch points is calculated. If not, then S1510 is performed, in which coordinate data of a single point is calculated.

(2) It is determined whether one of the differences ($R_1$'−$R_1$) and ($R_2$'−$R_2$) is greater than a threshold2. If yes, then Step S1511 is performed, in which coordinate data of multi-touch points is calculated. If not, then Step S1510 is performed, in which coordinate data of a single point is calculated.

(3) It is determined whether a ratio of max($R_1$', $R_2$') to min($R_1$', $R_2$') is greater than a threshold3. If yes, then Step S1511 is performed, in which coordinate data of multi-touch points is calculated. If not, then Step S1510 is performed, in which coordinate data of a single point is calculated.

(4) It is determined whether max($R_1$', $R_2$') is greater than a threshold4. If yes, then Step S1511 is performed, in which coordinate data of multi-touch points is calculated. If not, then Step S1510 is performed, in which coordinate data of a single point is calculated.

In Step S1508, the two pictures of the first group are used to respectively determine the dimensions ($R_1$ and $R_2$) representing the target, wherein the dimensions ($R_1$ and $R_2$) can be radii of imaginary circles determined by using the images of the two pictures.

In Step S1512, it is determined whether the ratio ($R_1$/$R_2$) or ($R_2$/$R_1$) is greater than the threshold3. If yes, then Step S1511 is performed, in which coordinate data of multi-touch points is calculated. If not, then Step S1510 is performed, in which coordinate data of a single point is calculated. Alternatively, it can be determined whether one of the dimensions ($R_1$ or $R_2$) is greater than threshold4. If yes, then Step S1511 is performed, in which coordinate data of multi-touch points is calculated. If not, then Step S1510 is performed, in which coordinate data of a single point is calculated.

Figure 16:
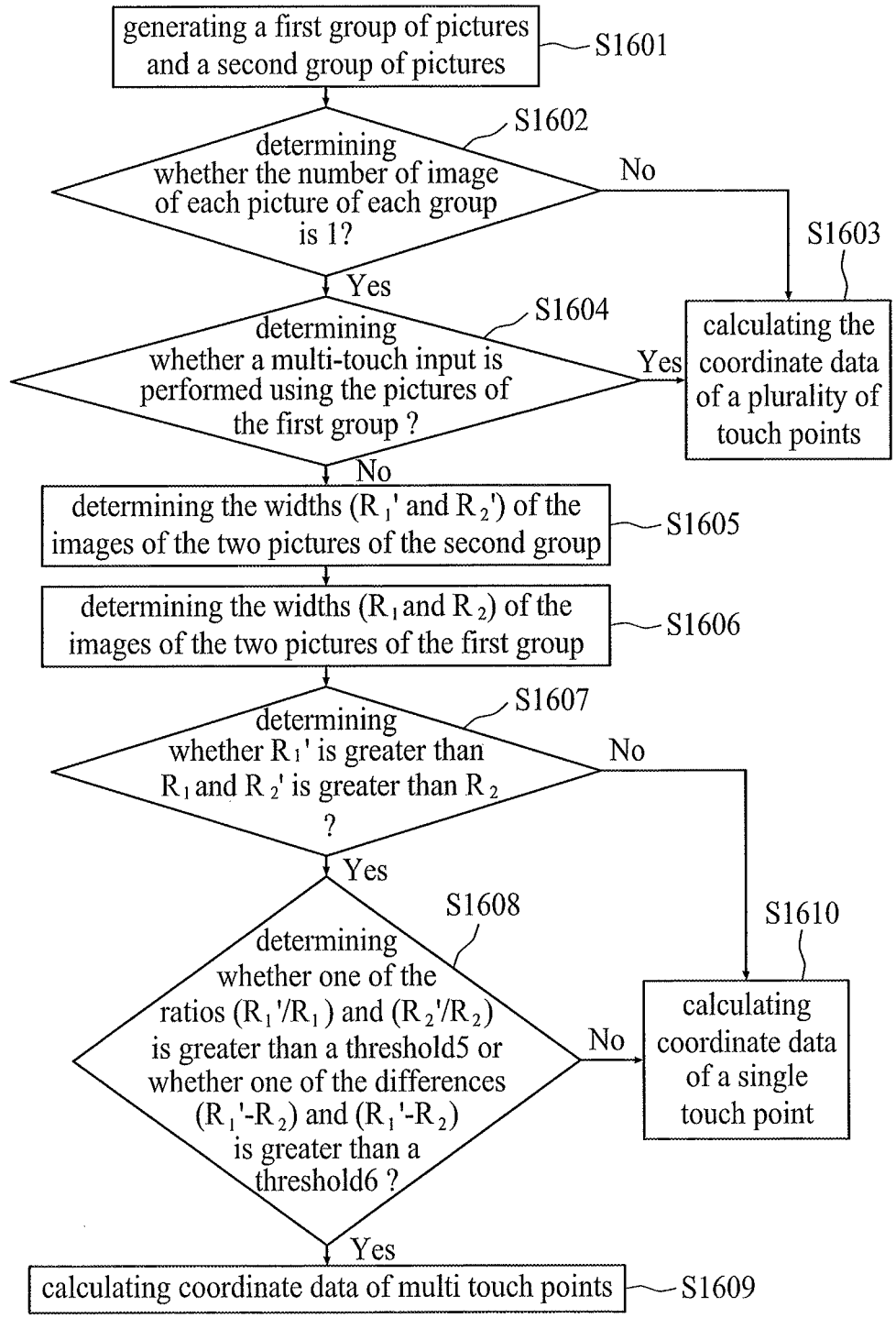
FIG. 16 is a flow chart showing the steps of a determination method for multi-touch operations according to another embodiment of the present invention.

FIG. 16 is a flow chart showing the steps of a determination method for multi-touch operations according to another embodiment of the present invention. Referring to FIG. 16, in Step S1601, the two imaging devices sequentially and respectively generate a first group of two pictures and a second group of two pictures.

In Step S1602, it is determined whether the number of images of each picture of each group is 1. If not, then Step S1603 is performed, in which coordinate data of the plurality of touch points is calculated. If yes, then Step S1604 is performed.

In Step S1604, it is verified whether a multi-touch input is performed by using the pictures of the first group. If yes, then Step S1603 is performed, in which the coordinate data of the plurality of touch points is calculated. If not, then Step S1605 is performed.

In Step S1605, the widths ($R_1$' and $R_2$') of the images of the two pictures of the second group are determined.

In Step S1606, the widths ($R_1$ and $R_2$) of the images of the two pictures of the first group are determined.

In Step S1607, it is determined whether $R_1$' is greater than $R_1$ and $R_2$' is greater than $R_2$. If not, then Step S1610 is performed, in which coordinate data of a single point is calculated. If yes, then Step S1608 is performed.

In Step S1608, it is determined whether one of the ratios ($R_1$'/$R_1$) and ($R_2$'/$R_2$) is greater than a threshold5 or whether one of the differences ($R_1$'−$R_1$) and ($R_2$'−$R_2$) is greater than a threshold6. If yes, then Step S1609 is performed, in which coordinate data of multi-touch points is calculated. If not, then Step S1610 is performed, in which coordinate data of a single touch point is calculated.

Figure 17A:
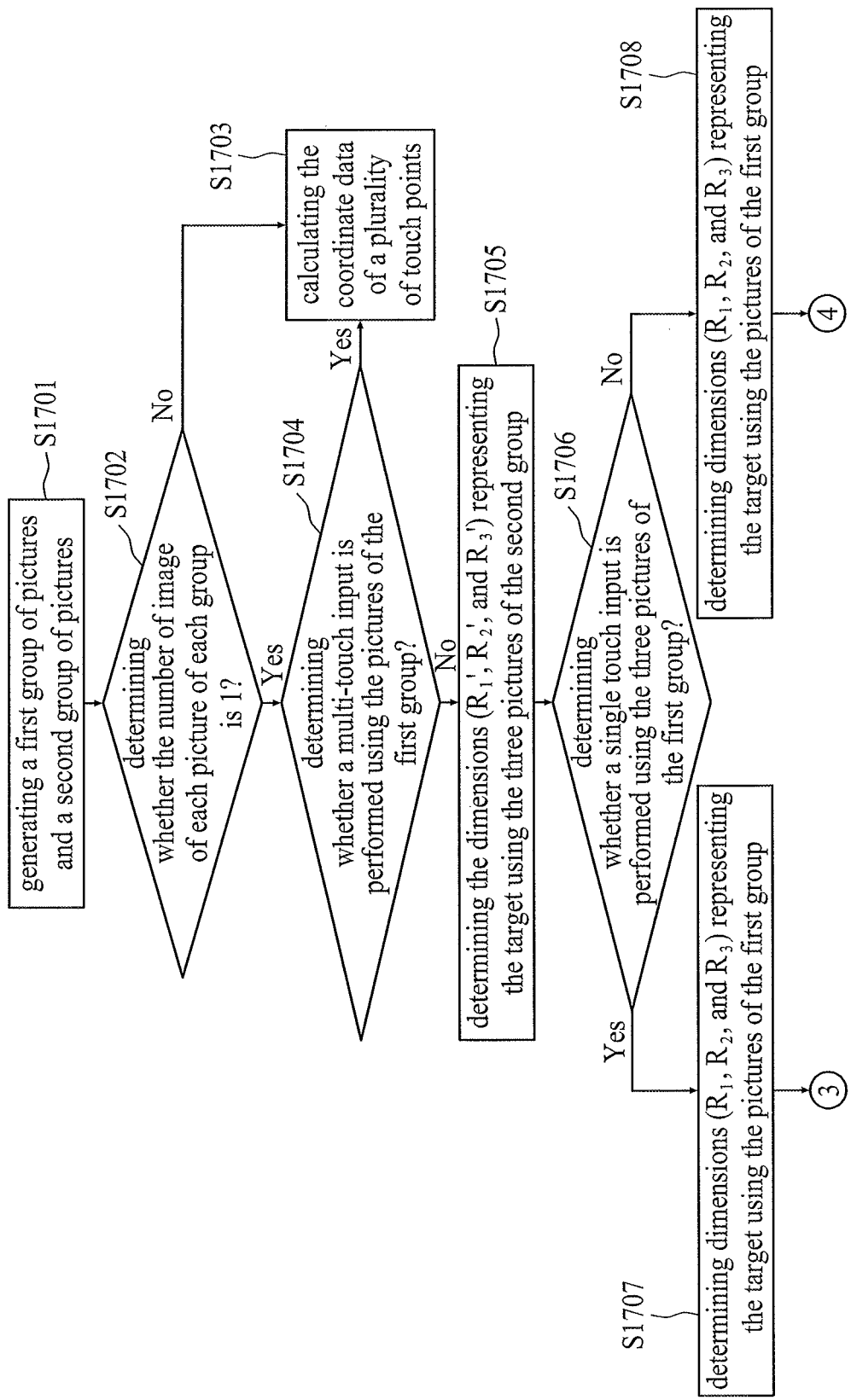
FIGS. 17A and 17B are flow charts showing the steps of a determination method for multi-touch operations according to another embodiment of the present invention.
Figure 17B:
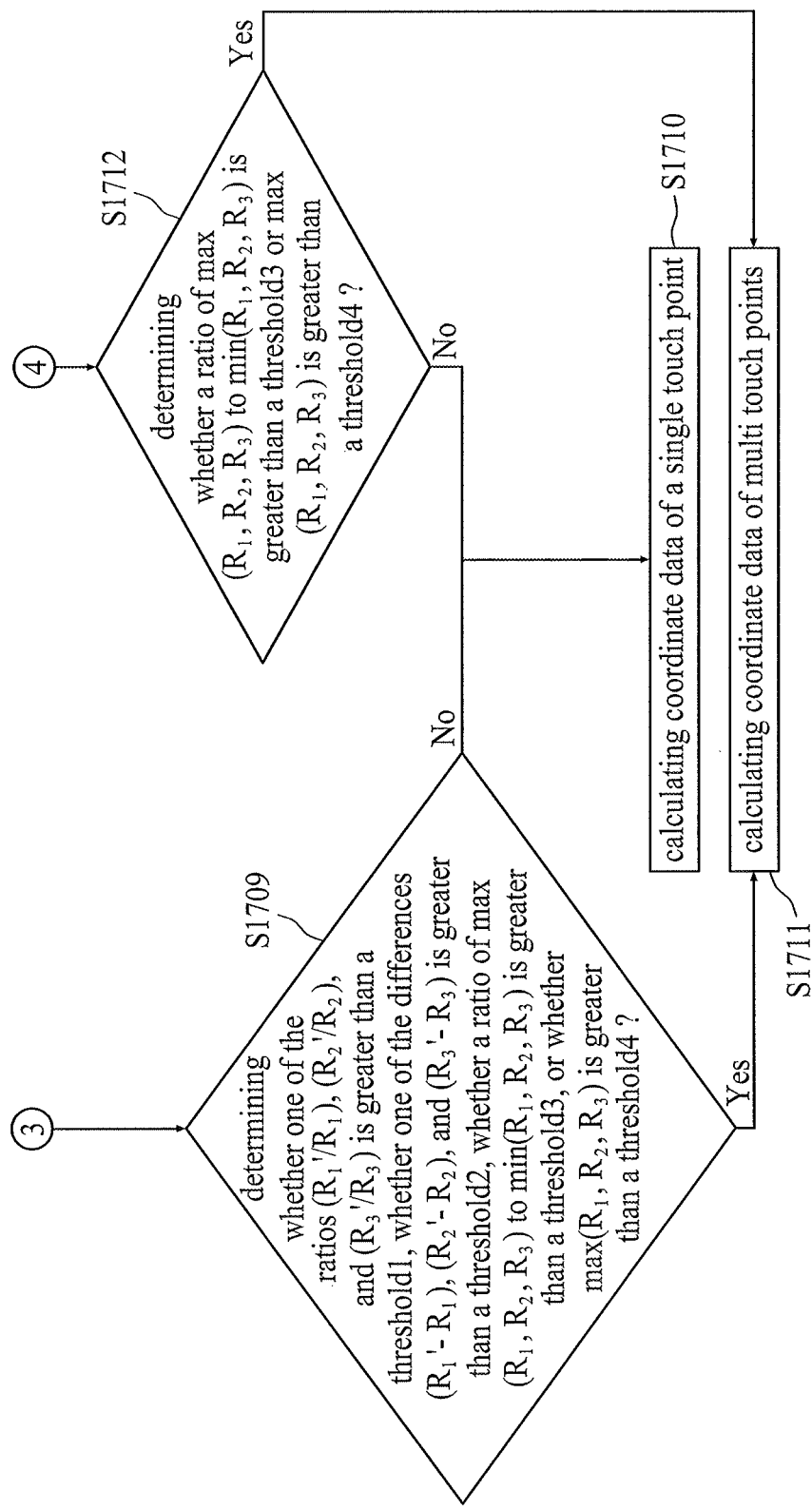

FIGS. 17A and 17B are flow charts showing the steps of a determination method for multi-touch operations according to another embodiment of the present invention. Referring to FIGS. 17A and 17B, in Step S1701, three imaging devices sequentially and respectively generate a first group of three pictures and a second group of three pictures.

In Step S1702, it is determined whether the number of images of each picture of each group is 1. If not, then Step S1703 is performed, in which coordinate data of the plurality of touch points is calculated. If yes, then Step S1704 is performed.

In Step S1704, the pictures of the first group is used to determine whether a multi-touch input is performed. If yes, then Step S1703 is performed, in which the coordinate data of the plurality of touch points is calculated. If not, then Step S1705 is performed.

In Step S1705, the three pictures of the second group are used to determine the dimensions ($R_1$', $R_2$', and $R_3$') representing the target, wherein the dimensions ($R_1$', $R_2$', and $R_3$') can be radii of imaginary circles obtained by using the images of the three pictures.

In Step S1706, three pictures of the first group is used to verify whether a single touch input is performed. If yes, then Step S1707 is performed; otherwise, Step S1708 is performed.

In Step S1707, the three pictures of the first group are used to determine the dimensions ($R_1$, $R_2$, and $R_3$) representing the target, wherein the dimensions ($R_1$, $R_2$, and $R_3$) can be radii of imaginary circles obtained by using the images of the three pictures.

In Step S1709, one of the following conditions (1) to (4) is used to determine whether a single point coordinate data or multi-point coordinate data is calculated:

(1) It is determined whether one of the ratios ($R_1'/R_1$), ($R_2'/R_2$), and ($R_3'/R_3$) is greater than a threshold1. If yes, then Step S1711 is performed, in which coordinate data of multi-touch points is calculated. If not, then Step S1710 is performed, in which coordinate data of a single point is calculated.

(2) It is determined whether one of the differences ($R_1'-R_1$), ($R_2'-R_2$), and ($R_3'-R_3$) is greater than, a threshold2. If yes, then Step S1711 is performed, in which coordinate data of multi-touch points is calculated. If not, then Step S1710 is performed, in which coordinate data of a single point is calculated.

(3) It is determined whether a ratio of max($R_1$, $R_2$, $R_3$) to min($R_1$, $R_2$, $R_3$) is greater than a threshold3. If yes, then Step S1711 is performed, in which coordinate data of multi-touch points is calculated. If not, then Step S1710 is performed, in which coordinate data of a single point is calculated.

(4) It is determined whether max($R_1$, $R_2$, $R_3$) is greater than a threshold4. If yes, then Step S15711 is performed, in which coordinate data of multi-touch points is calculated. If not, then Step S1710 is performed, in which coordinate data of a single point is calculated.

In Step S1708, the three pictures of the first group are used to determine the dimensions ($R_1$, $R_2$, and $R_3$) representing the target, wherein the dimensions ($R_1$, $R_2$, and $R_3$) can be radii of imaginary circles obtained by using the images of the three pictures.

In Step S1712, it is determined whether a ratio of max($R_1$, $R_2$, $R_3$) to min($R_1$, $R_2$, $R_3$) is greater than a threshold3 or max($R_1$, $R_2$, $R_3$) is greater than a threshold4. If yes, then Step S1711 is performed, in which coordinate data of multi-touch points is calculated. If not, then Step S1710 is performed, in which coordinate data of a single point is calculated.

The above thresholds can be the same to each other or at least partially different, which is determined by the system requirement or operating environment of the applied optical system.

The optical touch system of one embodiment of the present invention can compare dimensions representing a target obtained at different times or from different angles to determine whether the target is formed by one object or a plurality of objects. As such, incorrect calculation of coordinate data caused by mistaking a single touch input for multi-touch input can be avoided.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

It will be apparent to those skilled in the art that various modifications can be made to the disclosed embodiments. It is intended that the specification and examples be considered as exemplary only, with the true scope of the disclosure being indicated by the following claims and their equivalents.

What is claimed is:

1. An optical touch system comprising:
a first imaging device being directed toward a side surface of a target on a touch surface, and generating, in sequence, a first picture comprising an image of the target and a second picture comprising an image of the target; and
a computing device configured to calculate a first dimension that represents the target at the time when the first picture is taken using the first picture, and a second dimension that represents the target at the time when the second picture is taken using the second picture, and to determine whether the target is formed by one object or two objects by the first and second dimensions, wherein the computing device is configured to compare the first dimension with the second dimension, wherein the computing device is configured to calculate a ratio of the first dimension to the second dimension and to compare the ratio with a threshold.

2. The optical touch system of claim 1, further comprising a second imaging device being directed toward another side surface of the target, and configured to generate, in sequence, a third picture comprising an image of the target and a fourth picture comprising an image of the target, wherein the computing device is configured to calculate a third dimension that represents the target at the time when the third picture is taken using the third picture, and a fourth dimension that represents the target at the time when the fourth picture is taken using the fourth picture, and to determine whether the target is formed by one object or two objects by the third and fourth dimensions.

3. The optical touch system of claim 2, wherein the computing device is configured to calculate a first difference between the first dimension and the second dimension and a second difference between the third dimension and the fourth dimension, and to compare the largest of the first and second differences with a threshold.

4. The optical touch system of claim 3, wherein the computing device is configured to compare the first dimension with the second dimension, and to compare the third dimension with the fourth dimension.

5. The optical touch system of claim 2, wherein the computing device is configured to compare the larger of the second and fourth dimensions with a threshold.

6. The optical touch system of claim 2, wherein the third dimension is a width of the image of the third picture, and the fourth dimension is a width of the image of the fourth picture.

7. The optical touch system of claim 2, wherein the third dimension is a radius of an imaginary circle representing a dimension of the another side surface of the target, and the fourth dimension is a radius of another imaginary circle representing another dimension of the another side surface of the target.

8. The optical touch system of claim 1, wherein the first dimension is a width of the image of the first picture, and the second dimension is a width of the image of the second picture.

9. The optical touch system of claim 1, wherein the first dimension is a radius of an imaginary circle representing a dimension of the side surface of the target, and the second dimension is a radius of another imaginary circle representing another dimension of the side surface of the target.

10. An optical touch system comprising:
a first imaging device being directed toward a side surface of a target on a touch surface, and generating, in sequence, a first picture comprising an image of the target and a second picture comprising an image of the target;
a computing device configured to calculate a first dimension that represents the target at the time when the first picture is taken using the first picture, and a second dimension that represents the target at the time when the second picture is taken using the second picture, and to determine whether the target is formed by one object or two objects by the first and second dimensions, wherein the computing device is configured to compare the first dimension with the second dimension; and
a second imaging device being directed toward another side surface of the target, and configured to generate, in sequence, a third picture comprising an image of the target and a fourth picture comprising an image of the target, wherein the computing device is configured to calculate a third dimension that represents the target at the time when the third picture is taken using the third picture, and a fourth dimension that represents the target at the time when the fourth picture is taken using the fourth picture, and to determine whether the target is formed by one object or two objects by the third and fourth dimensions, and
wherein the computing device is configured to calculate a first ratio of the first dimension to the second dimension and to compare the first ratio with a threshold; and the computing device is configured to calculate a second ratio of the third dimension to the fourth dimension and to compare the second ratio with another threshold.

11. The optical touch system of claim 10, wherein the computing device is configured to compare the first dimension with the second dimension, and to compare the third dimension with the fourth dimension.

12. An optical touch system comprising:
a first imaging device being directed toward a side surface of a target on a touch surface, and generating, in sequence, a first picture comprising an image of the target and a second picture comprising an image of the target;
a computing device configured to calculate a first dimension that represents the target at the time when the first picture is taken using the first picture, and a second dimension that represents the target at the time when the second picture is taken using the second picture, and to determine whether the target is formed by one object or two objects by the first and second dimensions, wherein the computing device is configured to compare the first dimension with the second dimension; and
a second imaging device being directed toward another side surface of the target, and configured to generate, in sequence, a third picture comprising an image of the target and a fourth picture comprising an image of the target, wherein the computing device is configured to calculate a third dimension that represents the target at the time when the third picture is taken using the third picture, and a fourth dimension that represents the target at the time when the fourth picture is taken using the fourth picture, and to determine whether the target is formed by one object or two objects by the third and fourth dimensions, and
wherein the computing device is configured to calculate a ratio of the larger of the second and fourth dimensions to the lesser of the second and fourth dimensions, and to compare the ratio with a threshold.

13. An optical touch system comprising:
a first imaging device being directed toward a side surface of a target, generating a first picture comprising an image of the target;
a second imaging device being directed toward another side surface of the target, generating a second picture comprising an image of the target; and
a computing device configured to calculate a first radius of a first imaginary circle representing the target using the first picture, a second radius of a second imaginary circle representing the target using the second picture, and to determine whether the target is formed by one object or two objects by the first and second radii, wherein the computing device is configured to calculate a ratio of the larger of the first and second radii to the lesser of the first and second radii, and to compare the ratio with a threshold.

14. The optical touch system of claim 13, wherein the computing device is configured to compare the larger of the first and second radii with a threshold.

15. An optical touch system comprising:
a first imaging device being directed toward a first side surface of a target, generating a first picture comprising an image of the target;
a second imaging device being directed toward a second side surface of the target, generating a second picture comprising an image of the target;
a third imaging device being directed toward a third side surface of the target, generating a third picture comprising an image of the target; and
a computing device configured to calculate a first radius of a first imaginary circle representing the target using the first picture, a second radius of a second imaginary circle representing the target using the second picture, a third radius of a third imaginary circle representing the target using the third picture, and to determine whether the target is formed by one object or two objects using the first, second, and third radii, wherein the computing device is configured to calculate a ratio of the largest of the first, second, and third radii to the least of the first, second, and third radii, and to compare the ratio with a threshold.

16. The optical touch system of claim 15, wherein the computing device is configured to compare the largest of the first, second, and third radii with a threshold.

* * * * *